United States Patent
Goel et al.

(10) Patent No.: US 11,917,720 B2
(45) Date of Patent: Feb. 27, 2024

(54) METHODS, SYSTEMS, AND COMPUTER READABLE MEDIA FOR ENABLING FORWARDING OF SUBSEQUENT NETWORK FUNCTION SUBSCRIPTION UPDATES

(71) Applicant: Oracle International Corporation, Redwood Shores, CA (US)

(72) Inventors: Yesh Goel, Bangalore (IN); Sridhar Karuturi, Raleigh, NC (US); Doki Satish Kumar Patro, Bangalore (IN); Amarnath Jayaramachar, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 124 days.

(21) Appl. No.: 17/551,124

(22) Filed: Dec. 14, 2021

(65) Prior Publication Data
US 2023/0188972 A1 Jun. 15, 2023

(51) Int. Cl.
*H04W 8/20* (2009.01)
*H04W 8/18* (2009.01)
*H04W 48/18* (2009.01)

(52) U.S. Cl.
CPC ............ *H04W 8/20* (2013.01); *H04W 8/18* (2013.01); *H04W 48/18* (2013.01)

(58) Field of Classification Search
CPC .......... H04W 8/20; H04W 8/18; H04W 8/24; H04W 48/18; H04W 48/16; H04W 48/14; H04W 48/10; H04W 48/06
See application file for complete search history.

(56) References Cited

U.S. PATENT DOCUMENTS 10,609,530 B1 3/2020 Patil et al.
10,637,753 B1 4/2020 Taft et al.
(Continued)

FOREIGN PATENT DOCUMENTS

WO WO 2019/193129 A1 10/2019
WO WO 2020/002507 A1 1/2020
(Continued)

OTHER PUBLICATIONS

Notice of Publication for European Patent Application No. 21718460.5 (dated Jun. 14, 2023).

(Continued)

*Primary Examiner* — Rasheed Gidado
(74) *Attorney, Agent, or Firm* — Jenkins, Taylor & Hunt, P.A.

(57) ABSTRACT

Methods, systems, and computer readable media for enabling forwarding of subsequent network function subscription updates. A method includes forwarding, from a bootstrapped network function repository function (NRF) in a first region, a subscription creation request from a consumer network function to a target NRF in a second region. The method includes creating, at the target NRF, a subscription for the consumer network function. The method includes generating, at the target NRF, a hint comprising data indicating one or more alternate NRFs each sharing subscription state data with the target NRF. The method includes sending, from the target NRF to the consumer network function, a subscription response message including the hint.

20 Claims, 8 Drawing Sheets

(56) References Cited

U.S. PATENT DOCUMENTS

| | | | |
|---|---|---|---|
| 10,772,062 | B1 | 9/2020 | Albasheir et al. |
| 10,791,044 | B1 | 9/2020 | Krishan et al. |
| 10,819,636 | B1 | 10/2020 | Goel |
| 10,833,938 | B1 | 11/2020 | Rajput et al. |
| 10,939,370 | B2* | 3/2021 | Baek .................... H04W 16/14 |
| 11,082,393 | B2 | 8/2021 | Goel |
| 11,290,549 | B2 | 3/2022 | Krishan |
| 11,438,828 | B2 | 9/2022 | Sapra et al. |
| 11,470,544 | B2 | 10/2022 | Singh et al. |
| 11,483,694 | B2 | 10/2022 | Krishan |
| 11,589,298 | B2 | 2/2023 | Sapra et al. |
| 11,849,506 | B2 | 12/2023 | Jayaramachar et al. |
| 2006/0010224 | A1 | 1/2006 | Sekar et al. |
| 2009/0222584 | A1 | 9/2009 | Josefsberg et al. |
| 2013/0029708 | A1 | 1/2013 | Fox et al. |
| 2013/0198269 | A1 | 8/2013 | Fleischman et al. |
| 2013/0272123 | A1 | 10/2013 | Lee et al. |
| 2014/0349694 | A1 | 11/2014 | Raghothaman et al. |
| 2015/0119101 | A1 | 4/2015 | Cui et al. |
| 2016/0380906 | A1 | 12/2016 | Hodique et al. |
| 2018/0262625 | A1 | 9/2018 | McCarley et al. |
| 2019/0230556 | A1 | 7/2019 | Lee |
| 2019/0357216 | A1 | 11/2019 | Jung et al. |
| 2019/0370028 | A1 | 12/2019 | Shi et al. |
| 2020/0127916 | A1 | 4/2020 | Krishan |
| 2020/0137174 | A1 | 4/2020 | Stammers et al. |
| 2020/0404608 | A1 | 12/2020 | Albasheir et al. |
| 2021/0007023 | A1 | 1/2021 | Umapathy et al. |
| 2021/0044481 | A1 | 2/2021 | Xu et al. |
| 2021/0067485 | A1 | 3/2021 | Goel |
| 2021/0112443 | A1 | 4/2021 | Krishan et al. |
| 2021/0204200 | A1 | 7/2021 | Krishan et al. |
| 2021/0297935 | A1* | 9/2021 | Belling .................. H04L 45/00 |
| 2021/0385286 | A1 | 12/2021 | Wang et al. |
| 2021/0392197 | A1* | 12/2021 | Yang .................... H04L 67/306 |
| 2022/0015023 | A1* | 1/2022 | De-Gregorio-Rodriguez .............. H04L 67/51 |
| 2022/0038999 | A1 | 2/2022 | Sapra et al. |
| 2022/0060547 | A1 | 2/2022 | Krishan |
| 2022/0070648 | A1 | 3/2022 | Krishan |
| 2022/0240171 | A1 | 7/2022 | Singh |
| 2022/0286949 | A1 | 9/2022 | Sapra et al. |
| 2023/0007536 | A1* | 1/2023 | Sharma ............. H04W 28/0842 |
| 2023/0042219 | A1 | 2/2023 | Singh et al. |
| 2023/0099468 | A1 | 3/2023 | Khare et al. |

FOREIGN PATENT DOCUMENTS

| | | |
|---|---|---|
| WO | WO 2022/025988 A1 | 2/2022 |
| WO | WO 2022/046170 A1 | 3/2022 |
| WO | WO 2022/050987 A1 | 3/2022 |

OTHER PUBLICATIONS

Notice of Publication for European Patent Application No. 21714723.0 (dated Jun. 1, 2023).

Examination Report for Indian Patent Application No. IN 202247064258 (dated May 18, 2023).

Notice of Publication for European Patent Application No. 21715008.5 (dated May 10, 2023).

Non-Final Office Action for U.S. Appl. No. 17/392,288 (dated Apr. 5, 2023).

Notice of Allowance for U.S. Appl. No. 17/156,149 (dated Apr. 19, 2022).

Notice of Allowance for U.S. Appl. No. 16/942,713 (dated Nov. 29, 2021).

Notice of Allowance for U.S. Appl. No. 17/001,599 (dated Nov. 17, 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

Ex Parte Quayle Action for U.S. Appl. No. 16/942,713 (Sep. 13, 2021).

Commonly-Assigned, co-pending U.S. Appl. No. 17/497,879 for "Methods, Systems, and Computer Readable Media for Routing Inter-Public Land Mobile Network (INTER-PLMN) Messages Related to Existing Subscriptions with Network Function (NF) Repository Function (NRF) Using Security Edge Protection Proxy (SEPP)," (Unpublished, filed Oct. 8, 2021).

Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).

Notification of Transmittal of the International Search Report and the Written Opinion of the International Searching Authority, or the Declaration for U.S. Patent Application Serial No. PCT/US2021/020122 (Jun. 1, 2021).

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

Notification of Transmittal of the International Search Report and the Written Opinion of the International Searching Authority, or the Declaration for U.S. Patent Application Serial No. PCT/US2021/020121 (dated Jun. 1, 2021).

Notice of Allowance and Fee(s) Due for U.S. Appl. No. 17/001,599 (dated May 17, 2021).

Applicant-Initiated Interview Summary for U.S. Appl. No. 17/001,599 (dated May 5, 2021).

Commonly-Assigned, co-pending U.S. Appl. No. 17/193,337 for "Methods, Systems, and Computer Readable Media for Selecting Multiple Network Function Types Using a Single Discovery Request," (Unpublished, filed Mar. 5, 2021).

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).

Commonly-Assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

Commonly-Assigned, co-pending U.S. Appl. No. 16/942,713 for "Methods, Systems, and Computer Readable Media for Providing Network Function Discovery Service Enhancements," (Unpublished, filed Jul. 29, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).

(56) References Cited

OTHER PUBLICATIONS

"3rd Generation Partnership Project; Technical Specification Group Services and System Aspects; Procedures for the 5G System (5GS); Stage 2 (Release 16)," 3GPP TS 23.502, V16.5.0, pp. 1-594 (Jul. 2020).

"3rd Generation Partnership Project; Technical Specification Group Services and System Aspects; System architecture for the 5G System (5GS); Stage 2 (Release 16)," 3GPP TS 23.501, V16.5.0, pp. 1-441 (Jul. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Services and System Aspects; Procedures for the 5G System (5GS); Stage 2," 3GPP TS 23.502 V16.4.0 pp. 1-582 (Mar. 2020).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

Huawei, "eSBA: reselection of producer instance," 3GPP TSG-SA2 Meeting #132, pp. 1-2 (Apr. 12, 2019).

Docomo, "Update Solution 4 for implicit registration," SA WG2 Meeting #129, pp. 1-2 (Oct. 15-19, 2018).

Notice of Allowance for U.S. Appl. No. 17/392,288 (dated Jul. 27, 2023).

Notice of Allowance for U.S. Appl. No. 17/497,879 (dated Jul. 26, 2023).

Corrected Notice of Allowability for U.S. Appl. No. 17/193,337 (dated Jan. 24, 2023).

Notice of Allowance and Fee(s) Due for U.S. Appl. No. 17/193,337 (dated Oct. 12, 2022).

Applicant-Initiated Interview Summary for U.S. Appl. No. 17/193,337 (dated Sep. 7, 2022).

Notice of Allowance and Fee(s) Due for U.S. Appl. No. 17/009,725 (dated Jun. 13, 2022).

Commonly-Assigned, co-pending U.S. Appl. No. 17/746,895 for Methods, Systems, and Computer Readable Media for Facilitating Processing of Inter-Public Land Mobile Network (PLMN) Messages Related to Existing Subscriptions,' (Unpublished, filed May 17, 2022).

"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).

Notice of Allowance for U.S. Appl. No. 17/156, 149 (dated May 24, 2022).

Non-Final Office Action for U.S. Appl. No. 17/193,337 (dated May 11, 2022).

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

S2-1903559 eSBA reselection of Producer instance_v1.0—3GPP tsg sa\Wg2 arch, TSGS2 132 xian (Apr. 12, 2019).

S2-1811294-was18100700 Update Solution 4 for implicit registration—3GPP tsg sa\Wg2 arch (Oct. 2018).

First Office Action for Chinese Patent Application Serial No. 202180052441.4 (dated Aug. 30, 2023).

"Maximum payload size of NFDiscover Response", 3GPP TSG-CT WG4 Meeting #89 (2019).

Office Action for Japanese Patent Application Serial No. 2023503051 (dated Nov. 28, 2023).

\* cited by examiner

METHODS, SYSTEMS, AND COMPUTER READABLE MEDIA FOR ENABLING FORWARDING OF SUBSEQUENT NETWORK FUNCTION SUBSCRIPTION UPDATES

TECHNICAL FIELD

The subject matter described herein relates to telecommunications networks. More particularly, the subject matter described herein relates to methods, systems, and computer readable media for enabling forwarding of subsequent network function subscription updates.

BACKGROUND

In fifth generation (5G) communications networks, the network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. Consumer NFs can subscribe to receive information about producer NF instances that have registered with the NRF.

Consumer NFs can send subscription requests to NRFs. NRFs can forward subscription requests to other NRFs. For example, within a public land mobile network (PLMN), a NRF in one region of the PLMN may forward a subscription request another NRF in a different region of the PLMN. NRFs, however, may sometimes need to be able to determine an appropriate NRF for forwarding subsequent network function subscription updates.

In light of these and other difficulties, there exists a need for methods, systems, and computer readable media for enabling forwarding of subsequent network function subscription updates.

SUMMARY

Methods, systems, and computer readable media for enabling forwarding of subsequent network function subscription updates. A method includes forwarding, from a bootstrapped network function repository function (NRF) in a first region, a subscription creation request from a consumer network function to a target NRF in a second region. The method includes creating, at the target NRF, a subscription for the consumer network function. The method includes generating, at the target NRF, a hint comprising data indicating one or more alternate NRFs each sharing subscription state data with the target NRF. The method includes sending, from the target NRF to the consumer network function, a subscription response message including the hint.

According to another aspect of the subject matter described herein, the hint is included with or appended to a subscription identifier.

According to another aspect of the subject matter described herein, the hint comprises a region identifier for the second region.

According to another aspect of the subject matter described herein, the method includes receiving, at the bootstrapped NRF, a retry attempt from the consumer network function resulting from the target NRF not responding to the consumer network function, the retry attempt including the hint.

According to another aspect of the subject matter described herein, the method includes, at the bootstrapped NRF, using the hint to forward the retry attempt to a first alternate NRF of the one or more alternate NRFs sharing subscription state data with the target NRF.

According to another aspect of the subject matter described herein, the method includes, at the first alternate NRF, creating a new subscription for the consumer network function and sending a new subscription response message to the consumer network function.

According to another aspect of the subject matter described herein, generating the hint comprises generating the hint in conjunction with creating a subscription ID and processing the subscription creation request.

According to another aspect of the subject matter described herein, generating the hint comprises inserting the hint into a created subscription ID while sending the subscription response message.

According to another aspect of the subject matter described herein, the consumer network function is configured with a list of NRFs in the first region in a priority order.

According to another aspect of the subject matter described herein, the bootstrapped NRF is configured with a prioritized list of NRFs in the second region.

According to another aspect of the subject matter described herein, a system for enabling forwarding of subsequent network function subscription updates includes a bootstrapped network function repository function (NRF) in a first region and a target NRF in a second region. The bootstrapped NRF is implemented by at least a first processor and configured for forwarding a subscription creation request from a consumer network function to the target NRF. The target NRF is implemented by at least a second processor and configured for: creating a subscription for the consumer network function; generating a hint comprising data indicating one or more alternate NRFs each sharing subscription state data with the target NRF; and sending, to the consumer network function, a subscription response message including the hint.

According to another aspect of the subject matter described herein, the hint is included with or appended to a subscription identifier.

According to another aspect of the subject matter described herein, the hint comprises a region identifier for the second region.

According to another aspect of the subject matter described herein, the bootstrapped NRF is configured for receiving a retry attempt from the consumer network function resulting from the target NRF not responding to the consumer network function, the retry attempt including the hint.

According to another aspect of the subject matter described herein, the bootstrapped NRF is configured for using the hint to forward the retry attempt to a first alternate NRF of the one or more alternate NRFs sharing subscription state data with the target NRF.

According to another aspect of the subject matter described herein, the first alternate NRF is configured for creating a new subscription for the consumer network function and sending a new subscription response message to the consumer network function.

According to another aspect of the subject matter described herein, generating the hint comprises generating the hint in conjunction with creating a subscription ID and processing the subscription creation request.

According to another aspect of the subject matter described herein, generating the hint comprises inserting the hint into a created subscription ID while sending the subscription response message.

According to another aspect of the subject matter described herein, the consumer network function is configured with a list of NRFs in the first region in a priority order.

According to another aspect of the subject matter described herein, the bootstrapped NRF is configured with a prioritized list of NRFs in the second region.

According to another aspect of the subject matter described herein, one or more non-transitory computer readable media have stored thereon executable instructions that when executed by at least one processor of a computer cause the computer to perform steps comprising forwarding, from a bootstrapped network function repository function (NRF) in a first region, a subscription creation request from a consumer network function to a target NRF in a second region; creating, at the target NRF, a subscription for the consumer network function; generating, at the target NRF, a hint comprising data indicating one or more alternate NRFs each sharing subscription state data with the target NRF; and sending, from the target NRF to the consumer network function, a subscription response message including the hint.

The subject matter described herein can be implemented in software in combination with hardware and/or firmware. For example, the subject matter described herein can be implemented in software executed by a processor. In one example implementation, the subject matter described herein may be implemented using a computer readable medium having stored thereon computer executable instructions that when executed by the processor of a computer control the computer to perform steps.

Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for enabling forwarding of subsequent network function subscription updates.

The NRF is the network entity in the 5G core network (5GC) supporting the following functionality:

Maintains the NF profiles of available NF instances and their supported services;

Maintains the service communication proxy (SCP) profiles of available SCP instances;

Allows other NF or SCP instances to subscribe to and be notified of the registration in the NRF of new NF instances of a given type. It also allows SCP instances to subscribe to and be notified of the registration in the NRF of new SCP instances;

Supports the service discovery function. The NRF receives NF discovery requests from NF or SCP instances and provides the information of the available NF instances fulfilling certain criteria (e.g., supporting a given service);

Supports the SCP discovery function. It receives NF discovery requests for SCP profiles from other SCP instances and provides the information of the available SCP instances fulfilling certain criteria (e.g., serving a given NF set).

The methods, systems, and computer readable media described in this document can be implemented in the NRF. In some examples, a method for enabling forwarding of subsequent network function subscription updates includes creating a "hint" in or with the subscription identifier generated for forwarded within-PLMN network function subscription creation requests by the NRF. The hint can be used for forwarding subsequent network function subscription update and delete requests for the same subscription to the same or equivalent NRFs sharing state data by initial or intermediate NRFs.

Figure 1:
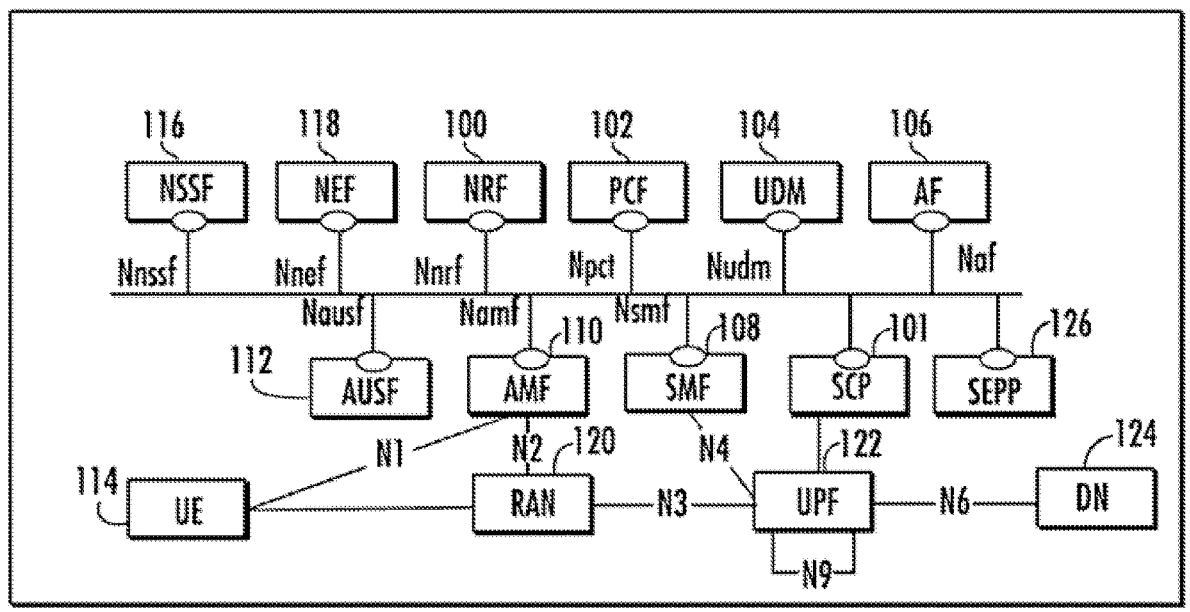
FIG. 1 is a block diagram illustrating an example 5G system network architecture.

FIG. 1 is a block diagram illustrating an example 5G system network architecture. The architecture in FIG. 1 includes NRF 100 and SCP 101, which may be located in the same home public land mobile network (HPLMN). NRF 100 may maintain profiles of available producer NF service instances and their supported services and allow consumer NFs or SCPs to subscribe to and be notified of the registration of new/updated producer NF service instances.

SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile can be a JavaScript object notation (JSON) data structure as defined in 3GPP Technical Specification (TS) 29.510.

In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services.

The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality.

UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a visitor PLMN which manages security for the visitor PLMN. Thus, traffic between NFs in different PLMNs may traverse two SEPP functions, one for the home PLMN and the other for the visitor PLMN.

The service operations defined for NRF 100 can include one or more of the following, as defined in Third Generation Partnership Project (3GPP) Technical Specification (TS) 29.510:

NFRegister: The NFRegister service operation allows an NF or SCP instance to register its profile in the NRF. The NFRegister service operation includes the registration of the general parameters of the NF or SCP instance, together with the list of potential services exposed by the NF or SCP instance. This service operation is not allowed to be invoked from an NRF in a different PLMN.

NFUpdate: The NFUpdate service operation allows an NF or SCP instance to replace or update partially the parameters of its profile (including the parameters of the associated services, if any) in the NRF. The NFUpdate service operation also allows an NF instance to add or delete individual services offered by the NF instance. This service operation is not allowed to be invoked from an NRF in a different PLMN.

NFDeregister: The NFDeregister service operation allows an NF or SCP instance to deregister its profile in the NRF, including the services offered by the NF Instance, if any. This service operation is not allowed to be invoked from an NRF in a different PLMN.

NFStatusSubscribe: The NFStatusSubscribe service operation allows an NF or SCP instance to subscribe to changes on the status of NF instances registered in NRF. The NFStatusSubscribe service operation also allows an SCP Instance to subscribe to changes on the status of other SCP Instances registered in the NRF. This service operation can be invoked by an NF instance in a different PLMN (via the local NRF in that PLMN). The NFStatusSubscribe service operation cannot be invoked by an SCP instance in a different PLMN.

NFStatusNotify: The NFStatusNotify service operation allows the NRF to notify subscribed NF or SCP instances of changes on the status of NF Instances. The NFStatusNotify service operation also allows the NRF to notify subscribed SCP instances of changes in status of SCP instances. This service operation can be invoked directly between the NRF and an NF instance in a different PLMN (without involvement of the local NRF in that PLMN). The StatusNotify service operation cannot be invoked between the NRF and an SCP instance in a different PLMN.

NFStatusUnsubscribe: The NFStatusUnsubscribe service operation allows an NF or SCP Instance to unsubscribe to changes on the status of NF Instances registered in the NRF. The NFStatusUnsubscribe service operation also allows an SCP instance to unsubscribe to changes on the status of other SCP instances registered in NRF. This service operation can be invoked by an NF instance in a different PLMN (via the local NRF in that PLMN). It cannot be invoked by an SCP instance in a different PLMN.

NFListRetrieval: The NFListRetrieval service operation allows retrieving a list of NFs and SCPs currently registered in the NRF. This service operation is not allowed to be invoked from an NRF in a different PLMN.

NFProfileRetrieval: The NFProfileRetrieval service operation allows retrieving the profile of a given NF or SCP instance. This service operation is not allowed to be invoked from an NRF in a different PLMN.

NRF 100 can offer a bootstrapping service to let consumer network functions of NRF 100 know about the service endpoints it supports, by using a version-independent URI endpoint that does not need to be discovered by using a discovery service. The version independent URI can identify, e.g., NRF 100 or the producer NFs registered with NRF 100.

This service can be used in inter-PLMN scenarios where the NRF in a PLMN-A needs to invoke services from an NRF in PLMN-B, when there is no pre-configured information indicating the version of the services deployed in PLMN-B. This service may also be used in intra-PLMN scenarios to avoid configuring statically in the different NFs information about the service versions deployed in the NRF to be used by those NFs.

Consumer NFs can send subscription requests to NRF 100. NRF 100 can forward subscription requests to other NRFs. For example, within a public land mobile network (PLMN), a NRF in one region of the PLMN may forward a subscription request another NRF in a different region of the PLMN.

NRF 100 can be configured to include a "hint" in or with the subscription identifier generated for forwarded within-PLMN network function subscription creation requests. The hint can be used for forwarding subsequent network function subscription update and delete requests for the same subscription to the same or equivalent NRFs sharing state data by initial or intermediate NRFs.

In some examples, one or more NRFs, such as NRF 100, perform a method that includes forwarding, from a bootstrapped NRF in a first region, a subscription creation request from a consumer network function to a target NRF in a second region. The method includes creating, at the target NRF, a subscription for the consumer network function. The term "bootrapped NRF" refers to an NRF that is configured with a prioritized list of NRFs in another region that the NRF contacts in a priority order to obtain NF profiles of producer NFs in another region.

The method includes generating, at the target NRF, a hint comprising data indicating one or more alternate NRFs each sharing subscription state data with the target NRF. The method includes sending, from the target NRF to the consumer network function, a subscription response message including the hint.

Figure 2:
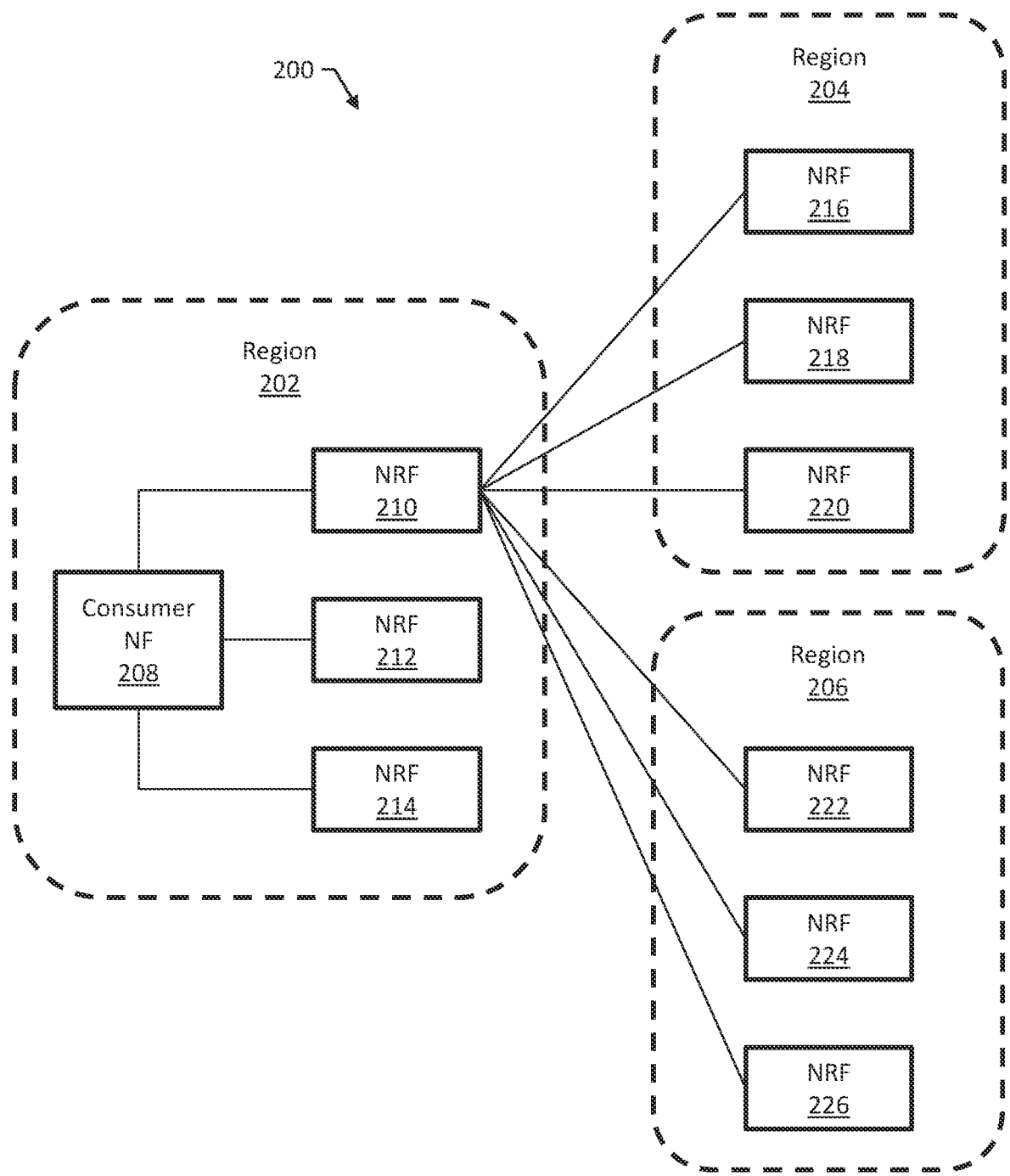
FIG. 2 is a block diagram of an example PLMN that illustrates NRF-NRF interconnection.

FIG. 2 is a block diagram of an example PLMN 200 that illustrates NRF-NRF interconnection. PLMN 200 includes more than one region; for purposes of illustration, three example regions are shown. Request forwarding may span two or more regions. FIG. 2 shows an example NRF-NRF forwarding use-case such that PLMN 200 includes region 202, region 204, and region 206.

A consumer network function 208 in region 202 is configured, e.g., by virtue of a stored list of identifiers or addresses, to access NRFs in region 202 to serve in a priority order in case of NRF failure in region 202. For example, the priority order may specify consumer network function 208 to access NRF 210 first, and if NRF 210 is not available, to then access NRF 212. If NRF 212 is not available, consumer network function 208 then attempts to access NRF 214, and so on.

Each of NRFs 210, 212, and 214 in region 202 is configured, e.g., by virtue of a stored list of identifiers or addresses, to access NRFs in remote regions to serve in a priority order in case of NRF forwarding to NRFs in other regions. For example, FIG. 2 illustrates priority orders for NRF 210.

NRF 210, when forwarding requests to region 204, will first attempt to forward a request to NRF 216 in region 204. If NRF 216 is unavailable, then NRF 210 will attempt to forward the request to NRF 218 in region 204. If NRF 218 is unavailable, then NRF 210 will attempt to forward the request to NRF 220 in region 204, and so on.

Similarly, NRF 210, when forwarding requests to region 206, will first attempt to forward a request to NRF 222 in region 206. If NRF 222 is unavailable, then NRF 210 will attempt to forward the request to NRF 224 in region 206. If NRF 224 is unavailable, then NRF 210 will attempt to forward the request to NRF 226 in region 206, and so on.

Figure 3:
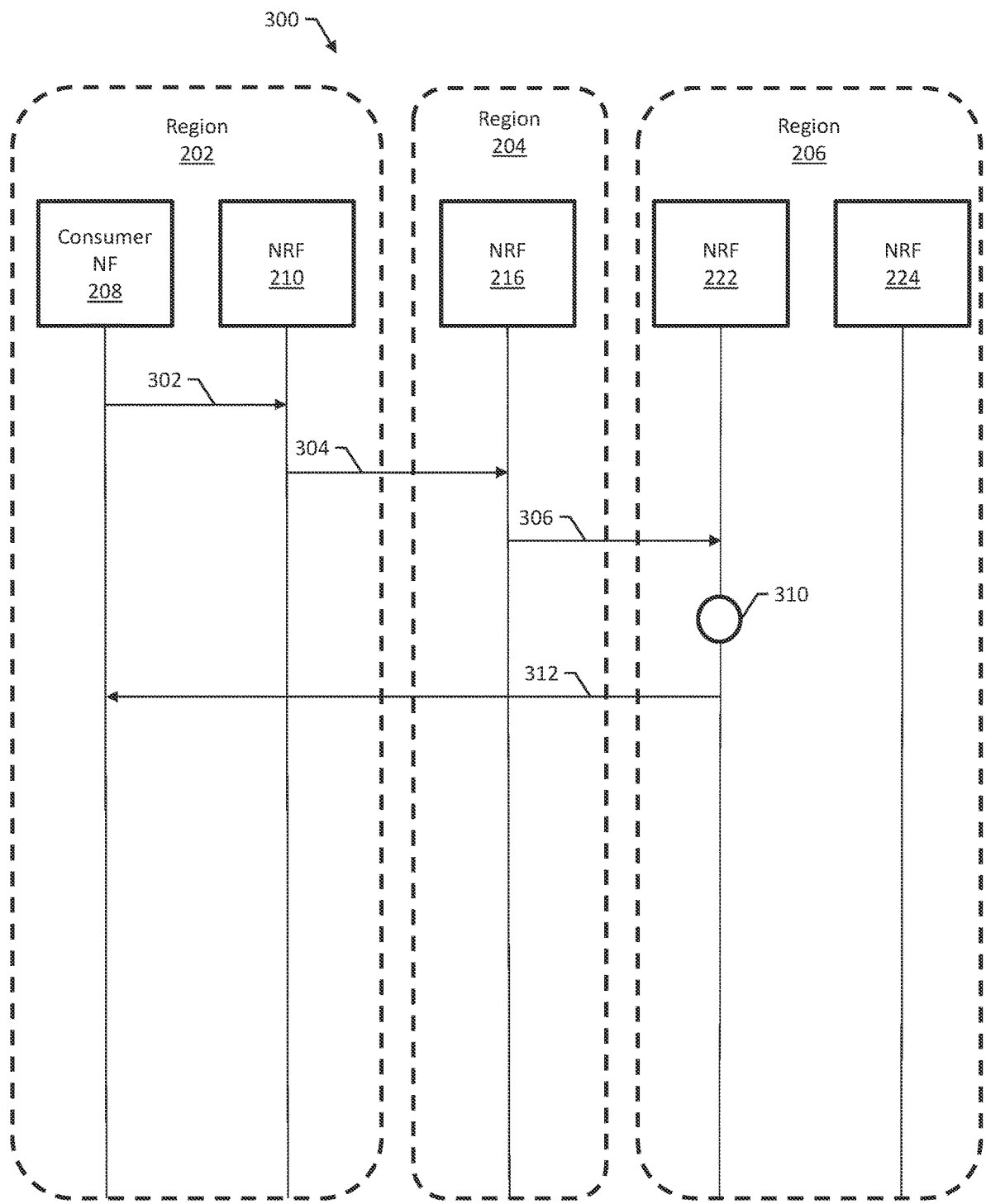
FIG. 3 is a message flow diagram illustrating an example within-PLMN network function subscription creation flow.

FIG. 3 is a message flow diagram illustrating an example within-PLMN network function subscription creation flow 300. FIG. 3 shows the three regions 202, 204, and 206 from FIG. 2. FIG. 3 shows the consumer network function 208 and NRF 210 in region 202, NRF 216 in region 204, and NRFs 222 and 224 in region 206.

Consumer network functions can be bootstrapped/configured with lists of NRFs (in a priority order) serving consumer network functions localities. Consumer network functions communicate with NRFs for NRF-specific operations, for example, network function registrations, updates, de-registrations, subscription creations, and discovery and access-tokens.

Based on subscription request parameters, a bootstrapped NRF may process a subscription request locally or may forward the subscription request to an NRF in another region. An NRF, in response to receiving a forwarded network function subscription creation request, validates whether it can create the subscription or whether it should determine to forward the request to an NRF in another region.

In the example shown in FIG. 3, consumer network function 208 sends a new subscription request 302 to NRF 210. Consumer network function 208 is configured to select NRF 210 as a priority NRF, i.e., such that NRF 210 is the bootstrapped NRF for consumer network function 208.

NRF 210 forwards the subscription request 304 to NRF 216 in region 204 based on forwarding criteria. NRF 216 determines to forward the subscription request 306 again based on forwarding criteria. NRF 216 forwards the subscription request 306 to NRF 222 in region 206.

At 310, NRF 222 creates the subscription and creates a subscription identifier for the subscription. NRF 222 sends a subscription response 312 all the way back to consumer network function 208 in the reverse direction of the request. The subscription response 312 includes the subscription identifier. The subscription response 312 can also include the resource path of the subscription in a location header, e.g., including the NRF forwarding chain.

Figure 4:
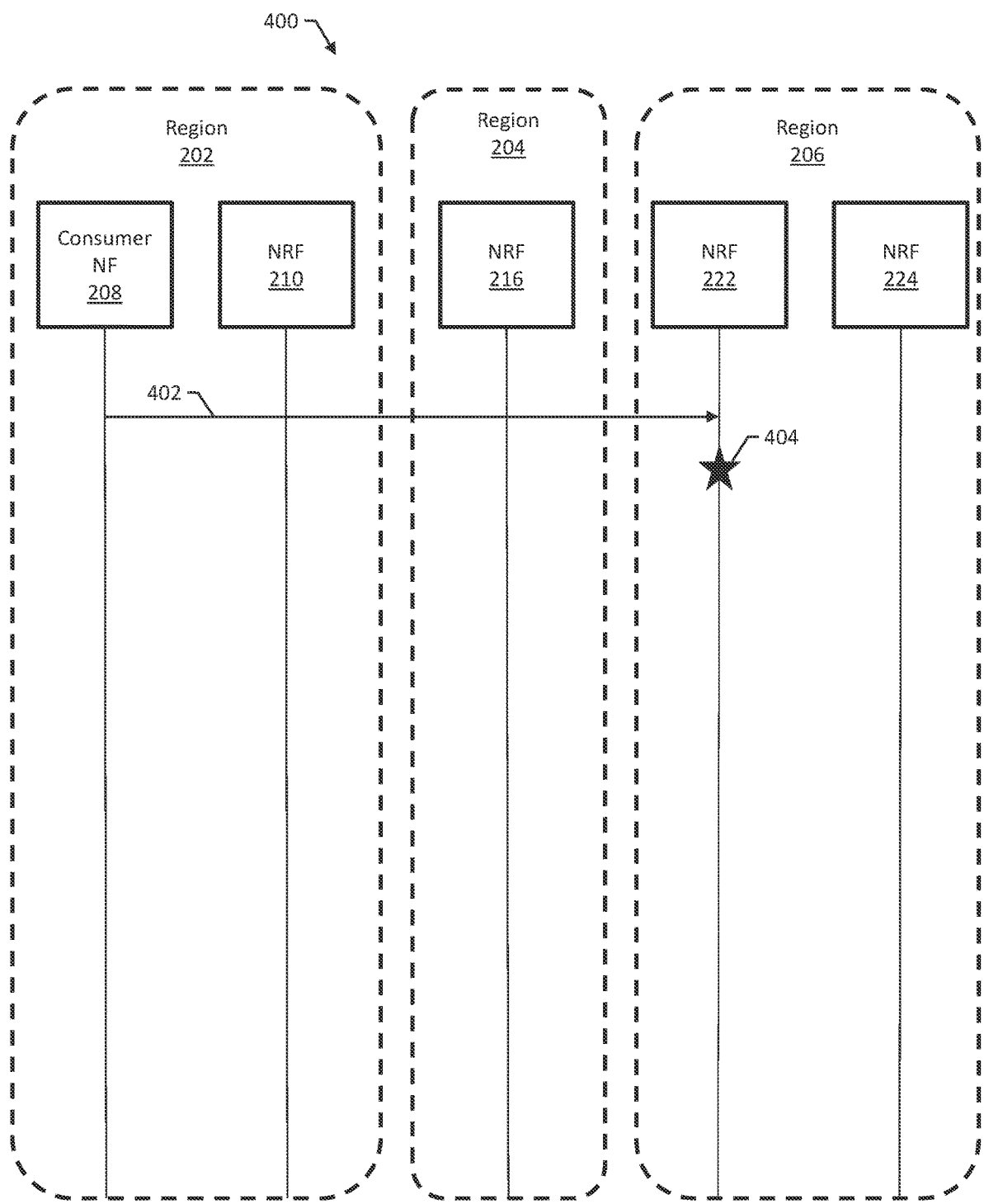
FIG. 4 is a message flow diagram illustrating a failed subsequent subscription update.

FIG. 4 is a message flow diagram illustrating a failed subsequent subscription update 400. FIG. 4 shows the three regions 202, 204, and 206 from FIG. 2. FIG. 4 shows the consumer network function 208 and NRF 210 in region 202, NRF 216 in region 204, and NRFs 222 and 224 in region 206.

As per 3GPP TS 29.510, consumer network function 208 is expected to send the subscription update/delete requests directly to the NRF as specified in the subscription resource received in the location header while creating the subscription, i.e., to NRF 222. Nonetheless, there is a possibility that when the target NRF, NRF 222, specified in the location header is unavailable/down, the subscription update/delete request will fail.

As shown in FIG. 4, consumer network function attempts to send a subscription update 402 directly to the NRF identified in the location header received in the subscription creation request, i.e., to NRF 222. NRF 222, however, is crashed or unreachable at 404 in this example.

Now, considering that region 206 may have alternate NRFs sharing state data with the failed target NRF, NRF 222, that can serve the subsequent network function subscription updates/delete requests, consumer network function 208 in region 202 could possibly be configured to attempt to send the subscription update to the alternative NRFs in region 206.

It may be challenging, however, if the onus of retrying to alternative NRFs in region 206 lies with consumer network function 208. Such a configuration could present the following challenges at consumer-NFs:
- Every consumer NF needs to be provisioned with details of alternative NRFs in all regions.
- Every consumer NF needs to implement retry logic.

These technical challenges could be a hassle to a telecommunications network operator or to a consumer network function designer.

Figure 5:
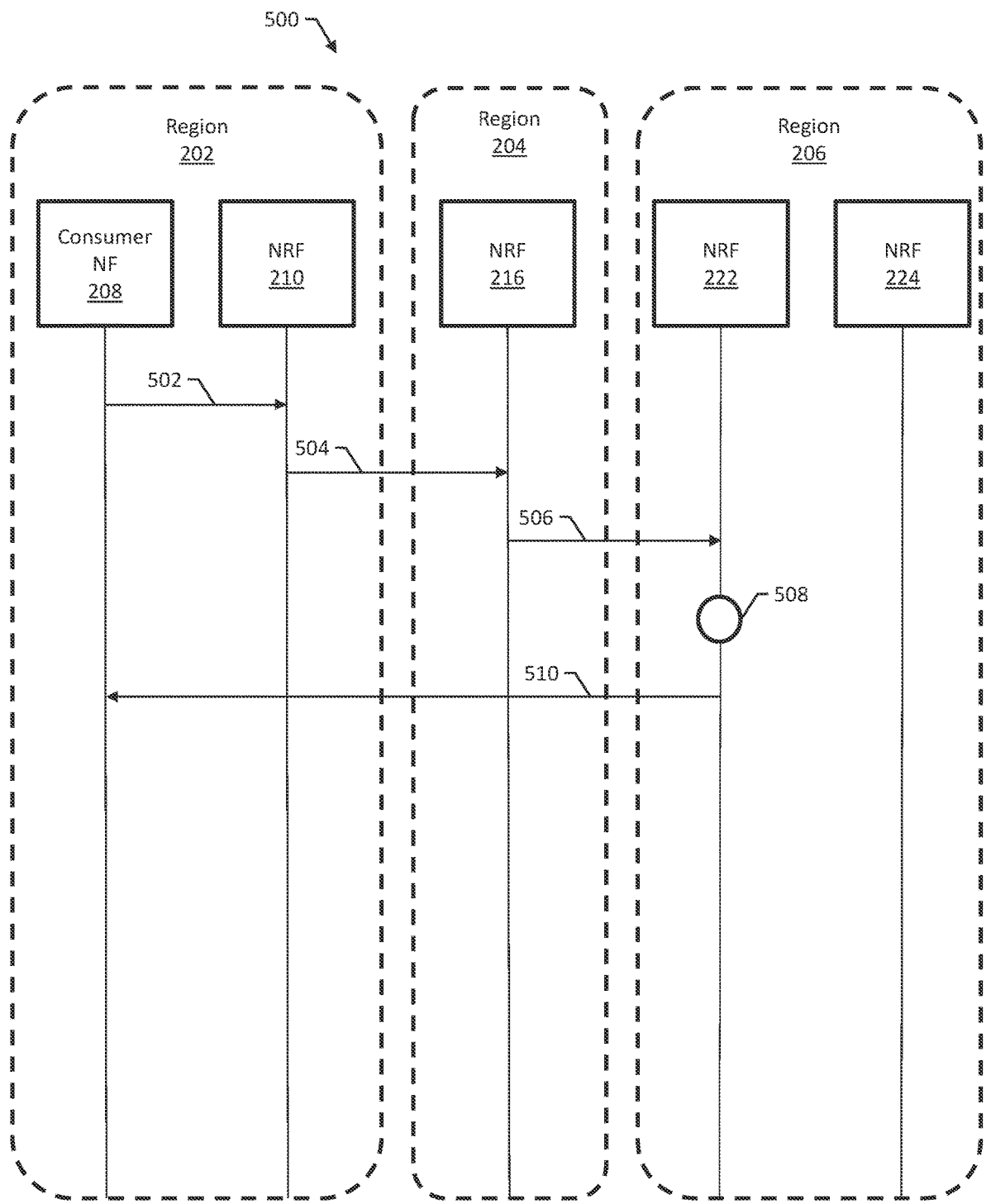
FIG. 5 is a message flow diagram illustrating enabling forwarding of subsequent network function subscription updates.

FIG. 5 is a message flow diagram illustrating enabling forwarding of subsequent network function subscription updates 500. FIG. 5 shows the three regions 202, 204, and 206 from FIG. 2. FIG. 5 shows the consumer network function 208 and NRF 210 in region 202, NRF 216 in region 204, and NRFs 222 and 224 in region 206.

The target NRF, NRF 222, can be configured to add a "hint" to the subscription-Id included in the network function subscription creation response that identifies the target NRF, NRF 222, and all other equivalent NRFs that share state data with the target NRF (in this example, NRF 224 and NRF 226). The hint is data specifying the alternate NRFs, and the hint can be comprised of any appropriate data and formatted as appropriate for the system.
- Equivalent NRFs share each other's state data to take up their traffic, often seamlessly, when one or more of them fail.
- The hint that is contained in/with the subscription-Id may be added either:
  - when generating the subscription-Id (i.e. at the time of processing NF subscription creation request), or
  - inserted in the generated subscription-Id when returning the subscription creation response.

In either case, NRFs in regions 202, 204, and 206 can be configured to identify the hint in subscription-Id to determine the target NRFs maintaining this subscription.

As shown in FIG. 5, consumer network function 208 sends a new subscription request 502 to the bootstrapped NRF, NRF 210. NRF 210 forwards the subscription request 504 to NRF 216 in region 204 based on forwarding criteria. For example, NRF 210 may determine that it lacks sufficient information to fulfill subscription request 502. NRF 216 in region 204 forwards the subscription request 506 to NRF 222 in region 206 based on forwarding criteria.

NRF 222 create the subscription with the subscription-Id containing the hint of the NRFs that may equivalently serve the subscription. For example, NRF 222 may append a region identifier for the region of NRF 222, region 206, to the subscription-Id. NRF 222 sends the subscription response 510 all the way back on the request flow to consumer network function 208. The subscription response 510 includes the subscription-Id, the hint, and the location header as described above with reference to FIG. 3.

Figure 6:
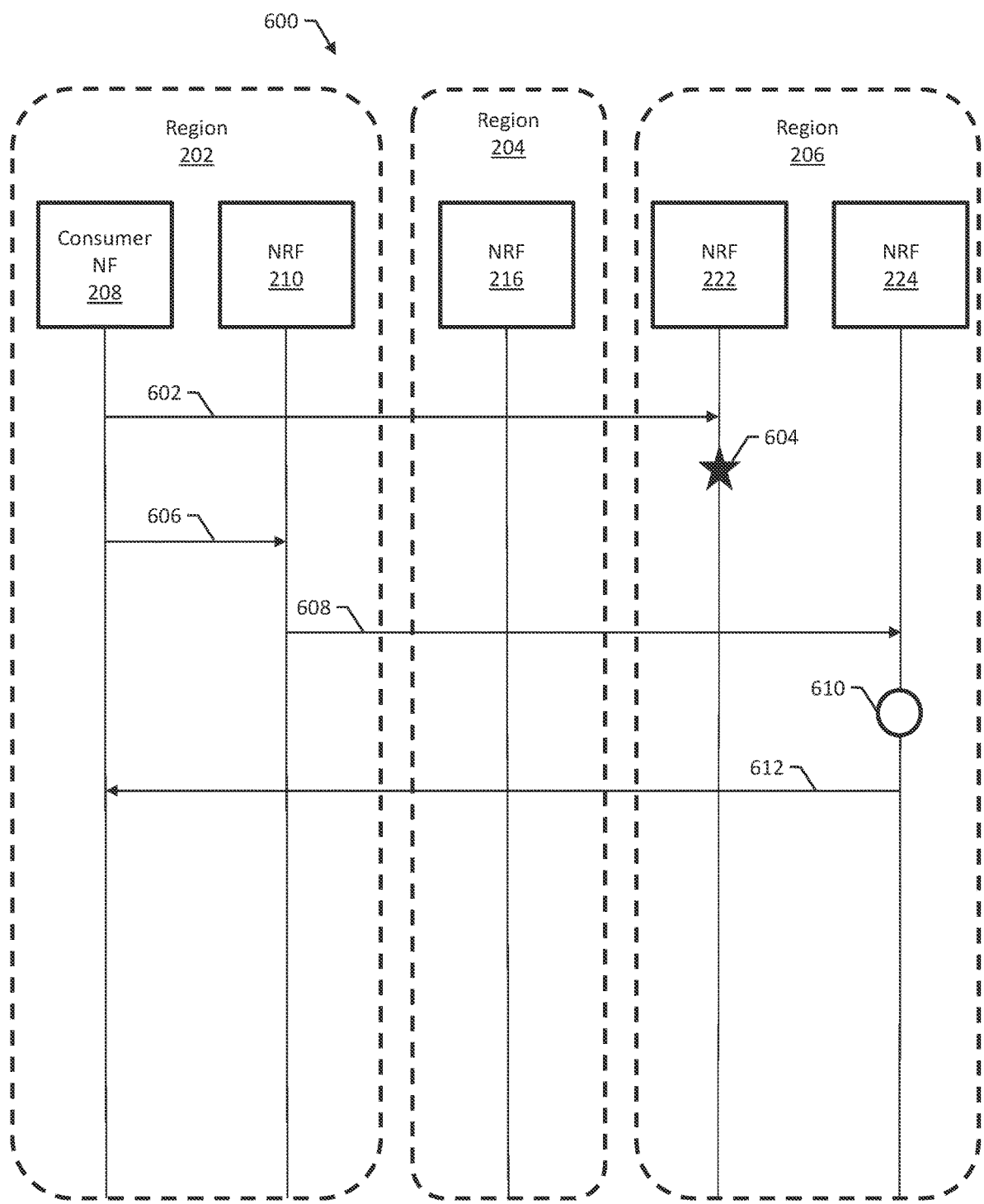
FIG. 6 is a message flow diagram illustrating forwarding of subsequent network function subscription updates using the hint.

FIG. 6 is a message flow diagram illustrating forwarding of subsequent network function subscription updates using the hint 600. FIG. 6 shows the three regions 202, 204, and 206 from FIG. 2. FIG. 6 shows the consumer network function 208 and NRF 210 in region 202, NRF 216 in region 204, and NRFs 222 and 224 in region 206.

When a network function subscription update/delete request attempted at the subscription resource URI (i.e., received in location header in response to NF subscription create request) have failed due to the target NRF specified in the location header being down, the consumer network function shall re-attempt these network function subscription update/delete requests to the bootstrapped NRF. The following operations may be performed by the bootstrapped NRF and the target NRF.

- The bootstrapped NRF may read the hint in the subscription-Id from the request and identify the NRFs that can serve the request.
- Based on the NRFs identified, the bootstrapped NRF will forward the NF subscription Update/Delete request in the order of priorities provisioned in it, e.g., by the operator
- The target NRF can then process the NF subscription/delete request and send the response that will go back in the reverse order of request.

As shown in FIG. 6, consumer network function 208 sends a subscription update 602 directly to the NRF specified in the location header received from the subscription creation request, NRF 222. At 604, however, NRF 222 is down.

Consumer network function 208 attempts to retry the subscription update 606 at the bootstrapped NRF, NRF 210. NRF 210 identifies the target region, region 206, from the hint with/within the subscription-Id and attempts the subscription update with NRFs in region 206 in the provisioned priority order. Since NRF 222 is down, NRF 210 forwards the subscription request 608 to NRF 224 in region 206.

NRF 224, at 610, successfully processes the network function subscription update/delete operation. NRF 224 sends a response 612 back to consumer network function 208 in the reverse order of the request.

Figure 7:
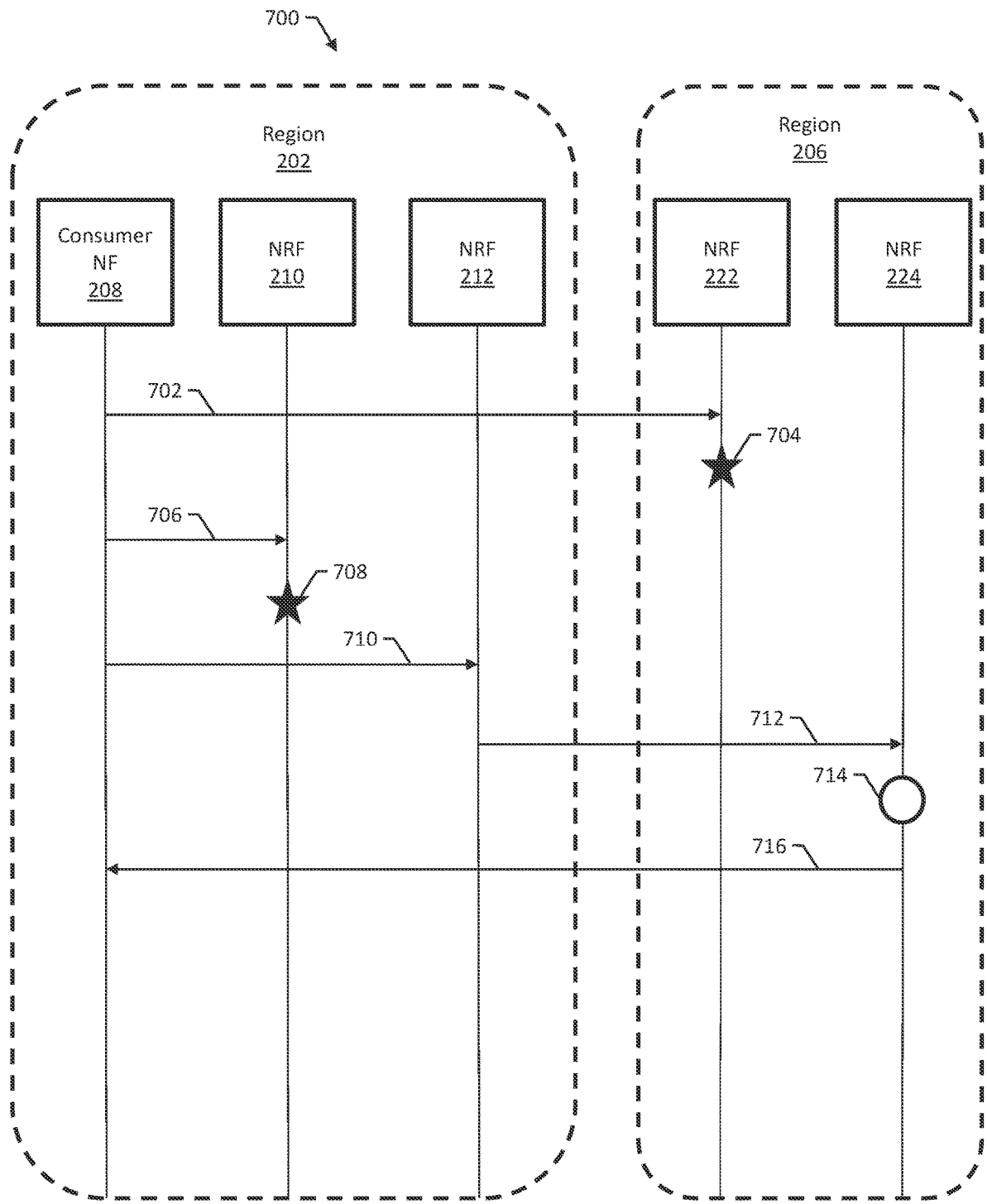
FIG. 7 is a message flow diagram illustrating forwarding of subsequent network function subscription updates when initial re-routing fails.

FIG. 7 is a message flow diagram illustrating forwarding of subsequent network function subscription updates when initial re-routing fails 700. FIG. 7 shows two of the three regions from FIG. 2, region 202 and region 206. FIG. 7 shows the consumer network function 208, NRF 210, and NRF 212 in region 202; and NRFs 222 and 224 in region 206.

If re-routing fails to the first bootstrapped NRF, NRF 210, then the next priority bootstrapped NRF can be retried by consumer network function 208.

As shown in FIG. 7, consumer network function 208 sends a subscription update 702 directly to the NRF specified in the location header received from the subscription creation request, NRF 222. At 704, however, NRF 222 is down.

Consumer network function 208 attempts to retry the subscription update 706 at the bootstrapped NRF, NRF 210. At 708, however, NRF 210 is down.

Consumer network function 208 attempts to retry the subscription update 710 at NRF 212 in region 202 because NRF 212 is next in the priority order. NRF 212 identifies the target region, region 206, from the hint with/within the subscription-Id and attempts the subscription update with NRFs in region 206 in the provisioned priority order.

Since NRF 222 is down, NRF 212 forwards the subscription request 712 to NRF 224 in region 206. NRF 224, at 714, successfully processes the network function subscription update/delete operation. NRF 224 sends a response 716 back to consumer network function 208 in the reverse order of the request.

Figure 8:
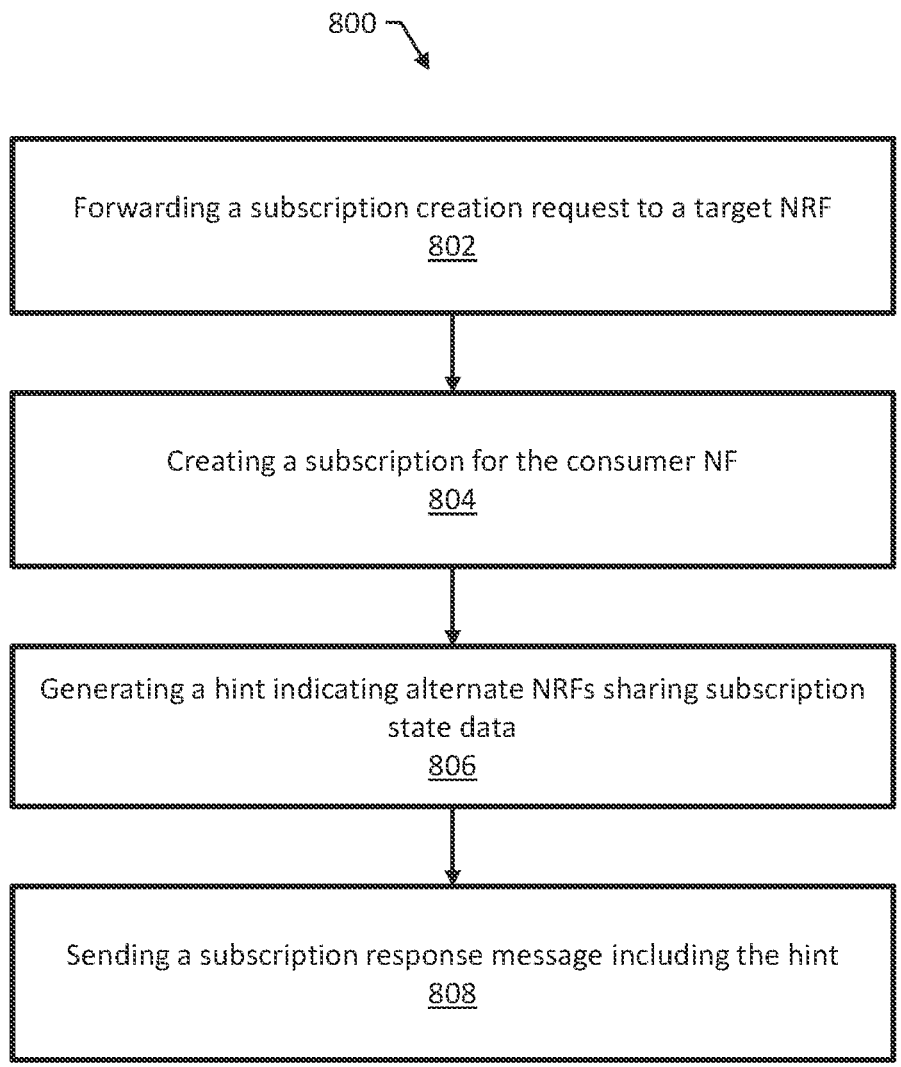
FIG. 8 is a flow diagram of an example method for enabling forwarding of subsequent network function subscription updates.

FIG. 8 is a flow diagram of an example method 800 for enabling forwarding of subsequent network function subscription updates. Method 800 is performed by a number of NRFs, such as the NRF 100 from FIG. 1.

In general, method 800 includes providing a "hint" in or with the subscription identifier generated for forwarded within-PLMN network function subscription creation requests by the NRF. The hint can be used for forwarding subsequent network function subscription update and delete requests for the same subscription to the same or equivalent NRFs sharing state data by initial or intermediate NRFs.

Method 800 includes forwarding, from a bootstrapped network function repository function (NRF) in a first region, a subscription creation request from a consumer network function to a target NRF in a second region (802). The consumer network function can be configured with a list of NRFs in the first region in a priority order. The bootstrapped NRF can be configured with a prioritized list of NRFs in the second region.

Method 800 includes creating, at the target NRF, a subscription for the consumer network function (804). Method 800 includes generating, at the target NRF, a hint comprising data indicating one or more alternate NRFs each sharing subscription state data with the target NRF (806). The hint can be included with or appended to a subscription identifier. The hint can include a region identifier for the second region.

The hint can be generated in conjunction with creating a subscription ID and processing the subscription creation request. Generating the hint can include inserting the hint into a created subscription ID while sending the subscription response message.

Method 800 includes sending, from the target NRF to the consumer network function, a subscription response message including the hint (808).

In some examples, method 800 includes receiving, at the bootstrapped NRF, a retry attempt from the consumer network function resulting from the target NRF not responding to the consumer network function, the retry attempt including the hint. Method 800 can include, at the bootstrapped NRF, using the hint to forward the retry attempt to a first alternate NRF of the one or more alternate NRFs sharing subscription state data with the target NRF. Method 800 can include, at the first alternate NRF, creating a new subscription for the consumer network function and sending a new subscription response message to the consumer network function.

On advantage of the subject matter described herein is that the bootstrapped NRF can use the hint to route retries of a subscription update or delete request to an alternate NRF when a first delivery attempt to the initial target NRF fails. Providing this functionality in the NRF reduces the need for consumer NFs to be provisioned with alternate NRFs in other regions.

REFERENCES

The disclosure of each of the following references is incorporated herein by reference in its entirety.
1. 3$^{rd}$ Generation Partnership Project; Technical Specification Group Core Network and Terminals; 5G System; Network Function Repository Services; Stage 3 (Release 17) 3GPP TS 29.510 V17.3.0 (2021 September)

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features.

In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for enabling forwarding of subsequent network function subscription updates, the method comprising:
   forwarding, from a bootstrapped network function repository function (NRF) in a first region, a subscription creation request from a consumer network function to a target NRF in a second region;
   creating, at the target NRF, a subscription for the consumer network function;
   generating, at the target NRF, a hint comprising data indicating one or more alternate NRFs, each sharing subscription state data with the target NRF; and
   sending, from the target NRF to the consumer network function, a subscription response message including the hint.

2. The method of claim 1, wherein the hint is included with or appended to a subscription identifier.

3. The method of claim 1, wherein the hint comprises a region identifier for the second region.

4. The method of claim 1, comprising receiving, at the bootstrapped NRF, a retry attempt from the consumer network function resulting from the target NRF not responding to the consumer network function, the retry attempt including the hint.

5. The method of claim 4, comprising, at the bootstrapped NRF, using the hint to forward the retry attempt to a first alternate NRF of the one or more alternate NRFs sharing subscription state data with the target NRF.

6. The method of claim 5, comprising, at the first alternate NRF, creating a new subscription for the consumer network function and sending a new subscription response message to the consumer network function.

7. The method of claim 1, wherein generating the hint comprises generating the hint in conjunction with creating a subscription ID and processing the subscription creation request.

8. The method of claim 1, wherein generating the hint comprises inserting the hint into a created subscription ID while sending the subscription response message.

9. The method of claim 1, wherein the consumer network function is configured with a list of NRFs in the first region in a priority order.

10. The method of claim 1, wherein the bootstrapped NRF is configured with a prioritized list of NRFs in the second region.

11. A system for enabling forwarding of subsequent network function subscription updates, the system comprising:
    a bootstrapped network function repository function (NRF) in a first region; and
    a target NRF in a second region;
    wherein the bootstrapped NRF is implemented by at least a first processor and configured for forwarding a subscription creation request from a consumer network function to the target NRF; and
    wherein the target NRF is implemented by at least a second processor and configured for:
      creating a subscription for the consumer network function;
      generating a hint comprising data indicating one or more alternate NRFs, each sharing subscription state data with the target NRF; and
      sending, to the consumer network function, a subscription response message including the hint.

12. The system of claim 11, wherein the hint is included with or appended to a subscription identifier.

13. The system of claim 11, wherein the hint comprises a region identifier for the second region.

14. The system of claim 11, wherein the bootstrapped NRF is configured for receiving a retry attempt from the consumer network function resulting from the target NRF not responding to the consumer network function, the retry attempt including the hint.

15. The system of claim 14, wherein the bootstrapped NRF is configured for using the hint to forward the retry attempt to a first alternate NRF of the one or more alternate NRFs sharing subscription state data with the target NRF.

16. The system of claim 11, wherein generating the hint comprises generating the hint in conjunction with creating a subscription ID and processing the subscription creation request.

17. The system of claim 11, wherein generating the hint comprises inserting the hint into a created subscription ID while sending the subscription response message.

18. The system of claim 11, wherein the consumer network function is configured with a list of NRFs in the first region in a priority order.

19. The system of claim 11, wherein the bootstrapped NRF is configured with a prioritized list of NRFs in the second region.

20. One or more non-transitory computer readable media having stored thereon executable instructions that when executed by at least one processor of a computer cause the computer to perform steps comprising:
- forwarding, from a bootstrapped network function repository function (NRF) in a first region, a subscription creation request from a consumer network function to a target NRF in a second region;
- creating, at the target NRF, a subscription for the consumer network function;
- generating, at the target NRF, a hint comprising data indicating one or more alternate NRFs, each sharing subscription state data with the target NRF; and
- sending, from the target NRF to the consumer network function, a subscription response message including the hint.

* * * * *